United States Patent
Maeda et al.

(10) Patent No.: US 12,119,723 B2
(45) Date of Patent: Oct. 15, 2024

(54) BUS BAR GUIDE, BUS BAR ASSEMBLY USING SAME, AND MOTOR

(71) Applicant: Panasonic Intellectual Property Management Co., Ltd., Osaka (JP)

(72) Inventors: Yuya Maeda, Osaka (JP); Yasuaki Matsushita, Kyoto (JP); Hirokazu Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 17/757,225

(22) PCT Filed: Oct. 20, 2020

(86) PCT No.: PCT/JP2020/039333
§ 371 (c)(1),
(2) Date: Jun. 11, 2022

(87) PCT Pub. No.: WO2021/124669
PCT Pub. Date: Jun. 24, 2021

(65) Prior Publication Data
US 2023/0006496 A1   Jan. 5, 2023

(30) Foreign Application Priority Data
Dec. 16, 2019   (JP) ................ 2019-226290

(51) Int. Cl.
*H02K 3/52*   (2006.01)
*H02K 21/16*   (2006.01)

(52) U.S. Cl.
CPC ............. *H02K 3/522* (2013.01); *H02K 21/16* (2013.01); *H02K 2203/09* (2013.01)

(58) Field of Classification Search
CPC .... H02K 3/522; H02K 21/16; H02K 2203/09; H02K 3/50; H02K 3/04; H02K 3/52
USPC ............................................................. 310/71
See application file for complete search history.

(56) References Cited

U.S. PATENT DOCUMENTS

2016/0329772 A1   11/2016   Fukunaga
2020/0059127 A1   2/2020    Yamashita et al.

FOREIGN PATENT DOCUMENTS

| CN | 103231490 A | 8/2013 | |
| EP | 2849315 A2 * | 3/2015 | ............ H02K 3/28 |
| JP | 04007176 B2 * | 11/2007 | |
| JP | 2013-090404 | 5/2013 | |

(Continued)

OTHER PUBLICATIONS

International Search Report of PCT application No. PCT/JP2020/039333 dated Dec. 15, 2020.

(Continued)

*Primary Examiner* — Jose A Gonzalez Quinones
(74) *Attorney, Agent, or Firm* — Rimon P.C.

(57) ABSTRACT

A bus bar guide is provided to fix bus bars that connect a plurality of coils disposed in a motor. The bus bar includes a conductor that has a plate shape and has a first surface and a second surface continuous with the first surface. The bus bar guide is configured by annularly arranging a plurality of bus bar guide pieces each including an insulator. Each of the plurality of bus bar guide pieces is provided with a groove that holds the first surface of the bus bar and positions the bus bar.

17 Claims, 9 Drawing Sheets

(56) References Cited

FOREIGN PATENT DOCUMENTS

| | | | |
|---|---|---|---|
| JP | 2013-236455 A | | 11/2013 |
| JP | 2016-208577 | | 12/2016 |
| JP | 2019507574 A | * | 3/2019 |
| KR | 101027641 B1 | * | 4/2011 |
| WO | 2015/060058 | | 4/2015 |
| WO | 2018/180447 | | 10/2018 |

OTHER PUBLICATIONS

The EPC Office Action dated Jan. 9, 2023 for the related European Patent Application No. 20903458.6.

* cited by examiner

BUS BAR GUIDE, BUS BAR ASSEMBLY USING SAME, AND MOTOR

FIELD OF THE INVENTION

The present invention relates to a bus bar guide, a bus bar assembly using the bus bar guide, and a motor.

DESCRIPTION OF THE RELATED ART

Conventionally, a configuration using a plate-shaped bus bar for connecting a plurality of coils provided in a motor is widely known.

For example, PTL 1 discloses a configuration in which a plurality of grooves are provided in an annular insulator provided on an upper part of a stator core, and bus bars are respectively fitted and held in the grooves.

CITATION LIST

Patent Literature

PTL 1: Unexamined Japanese Patent Publication No. 2013-090404

SUMMARY OF THE INVENTION

However, in the conventional configuration as disclosed in PTL 1, the insulator holding the bus bar is integrally formed as one component. For this reason, it has been difficult to arrange each component at a predetermined position by absorbing variations in a shape of each of the plurality of bus bars or variations in a position of a terminal of each coil. In addition, positional displacement of each component also occurs due to variations in a shape of the insulator, and it has been difficult to reliably connect the coils.

The present invention has been made in view of such drawbacks. An object of the present invention is to provide a bus bar guide capable of absorbing variations in a shape and arrangement of each component and reliably connecting coils, a bus bar assembly using the bus bar guide, and a motor.

In order to achieve the above object, a bus bar guide of the present invention is a bus bar guide that fixes a bus bar that connects a plurality of coils provided in a motor, in which the bus bar includes a conductor having a plate shape and having a pair of first surfaces that extend in a radial direction and face each other and a pair of second surfaces that extend in an axial direction, are continuous with the pair of first surfaces, and face each other, the bus bar guide is configured by annularly arranging a plurality of bus bar guide pieces each including an insulator, and each of the plurality of bus bar guide pieces is provided with a groove that holds one of the pair of first surfaces of the bus bar and positions the bus bar.

The bus bar assembly of the present invention includes at least the bus bar guide and the plurality of bus bars disposed in the plurality of grooves provided on the upper surface of the bus bar guide.

A motor of the present invention includes at least a rotor having an output shaft at an axial center, a stator disposed with a predetermined space from the rotor, the bus bar assembly attached to an upper part of the stator, in which the stator includes a yoke having an annular shape, a plurality of teeth connected to an inner circumference of the yoke at predetermined intervals, and a plurality of coils respectively attached to the plurality of teeth, and two of the plurality of coils are electrically connected via one of the plurality of bus bars.

In the bus bar guide of the present invention, variations in the shape of the bus bar can be absorbed, and the plurality of bus bars can be easily disposed in the bus bar guide. In the bus bar assembly of the present invention, variations in the shape of the bus bar can be absorbed, and the plurality of bus bars can be easily disposed in the bus bar guide. In the motor of the present invention, the plurality of bus bars can be easily installed in the bus bar guide. Since the plurality of bus bars are positioned and disposed in the bus bar guide, the assembly process of the motor is simplified, and the assembly cost can be reduced.

DETAILED DESCRIPTION OF THE PREFERRED EMBODIMENTS

Hereinafter, exemplary embodiments of the present invention will be described in detail with reference to the drawings. Following descriptions of preferable exemplary embodiments are substantially examples, and are not intended to limit the present invention, and applications or uses of the present invention.

EXEMPLARY EMBODIMENT

[Configuration of Motor]

Figure 1:
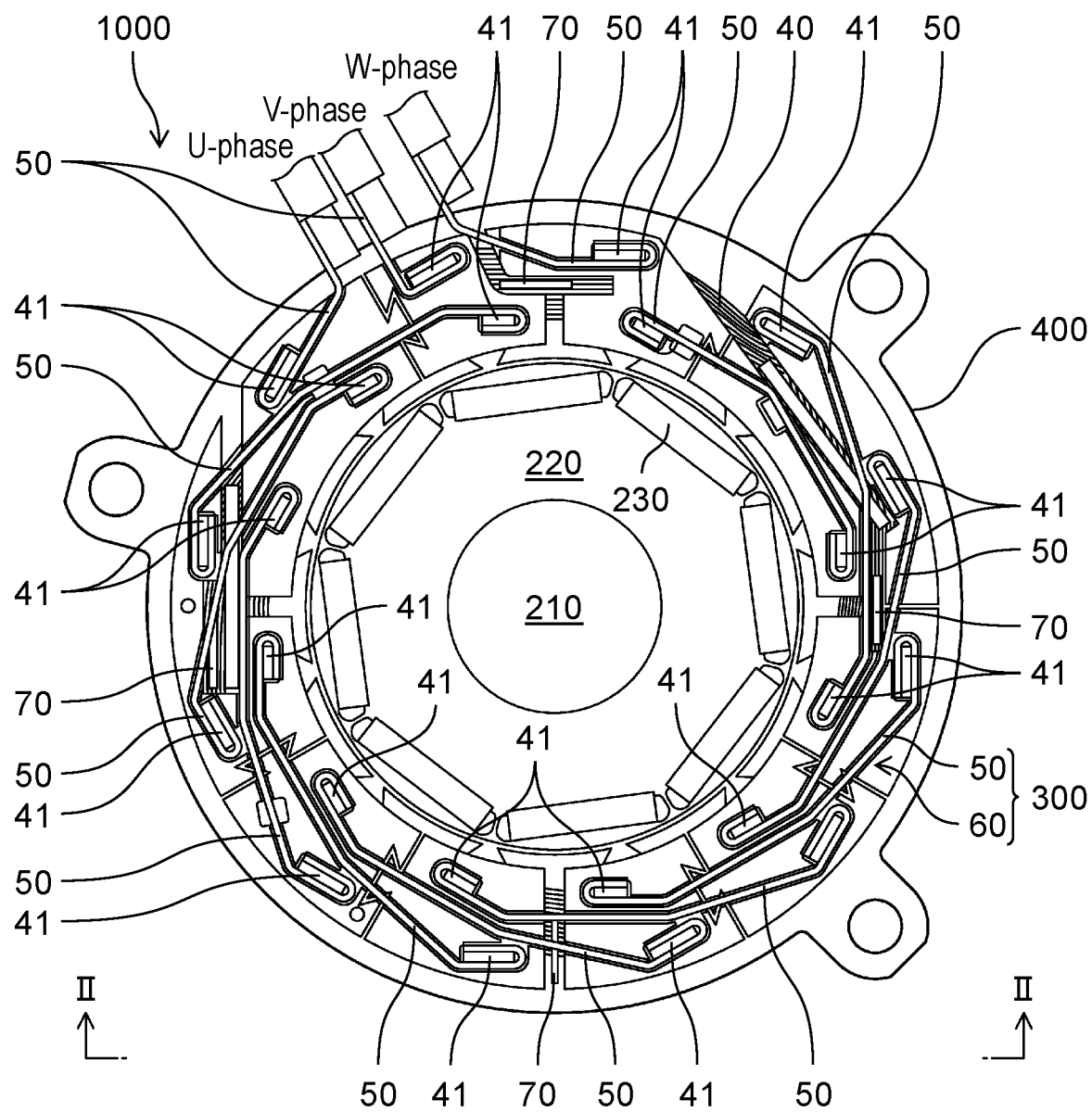
FIG. 1 is a top view of a motor according to an exemplary embodiment of the present invention.
Figure 2:
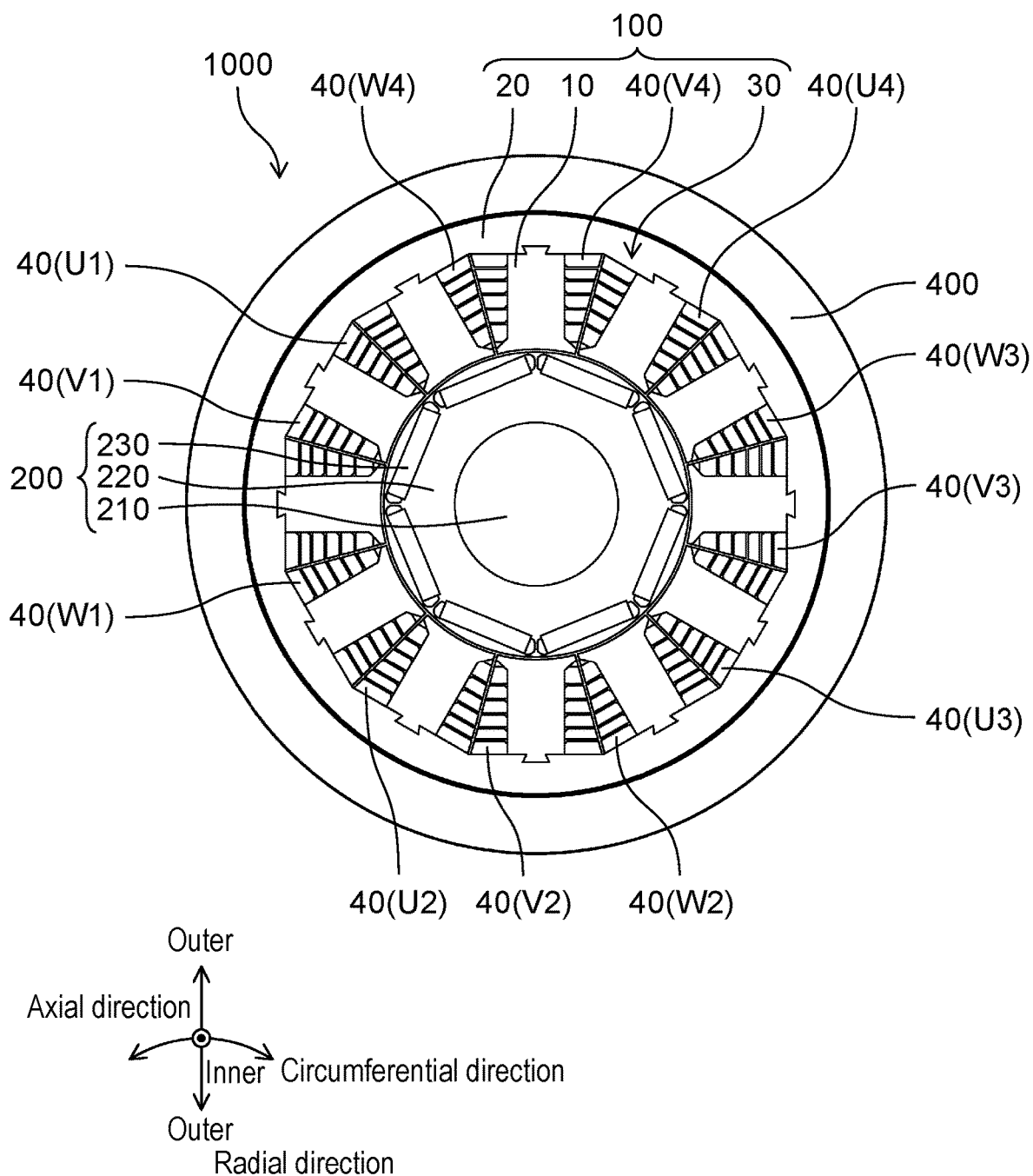
FIG. 2 is a sectional view along line II-II in FIG. 1.

FIG. 1 is a top view of a motor according to the exemplary embodiment of the present invention. FIG. 2 is a sectional view along line II-II in FIG. 1. In the following description, a direction along a radius of motor 1000 may be referred to as a "radial direction", an outer circumferential direction may be referred to as a "circumferential direction", and a direction along an axial line of output shaft 210 of motor 1000 (a direction perpendicular to the plane in the page of FIG. 1) may be referred to as an "axial direction". In the radial direction, a central side of motor 1000 may be referred to as a radially inner side, and an outer circumferential side may be referred to as a radially outer side. The outer circumferential direction of motor 1000 is the same as an outer circumferential direction of bus bar guide 60 described later. Therefore, the outer circumferential direction of bus bar guide 60 may also be referred to as a "circumferential direction". Similarly, the direction along the radius of motor 1000 and a direction along the radius of bus bar guide 60 are the same. Therefore, the direction along the radius of bus bar guide 60 may also be referred to as a "circumferential direction". In motor 1000, a side on which bus bar guide 60 is provided may be referred to as upward or an upper part, and an opposite side along the axial direction may be referred to as downward or a lower part. In FIG. 2, lead 41 of coil 40 is not shown. When viewed in the axial direction, an axis of motor 1000 coincides with the axial line of output shaft 210.

Motor 1000 includes stator 100, rotor 200, and motor case 400. Motor 1000 has components other than these components, for example, components such as a bearing that pivotally supports the output shaft. However, for convenience of description, illustration and description of the components are omitted.

Stator 100 includes annular yoke 20, a plurality of teeth 10, slot 30, and coil 40. The plurality of teeth 10 are connected to an inner circumference of yoke 20 and are provided along the inner circumference at equal intervals. Slots 30 are provided between teeth 10 adjacent to each other in the circumferential direction. Coil 40 is accommodated in slot 30. Stator 100 is disposed on a radially outer side of rotor 200 with a predetermined space between stator 100 and rotor 200.

Teeth 10 and yoke 20 are each formed by, for example, stacking electromagnetic steel sheets containing silicon and the like and then by punching the stacked electromagnetic steel sheets. Coil 40 is a component formed by spirally winding a conductive wire including copper or the like having a quadrangular cross section. Coil 40 has leads 41 at both ends. Coils 40 are accommodated in slot 30, each being attached to one of the plurality of teeth 10 via an insulator (not shown). Although not illustrated, an insulating film is formed on a surface of a conductive wire constituting coil 40. Bus bar 50 is connected to a distal end of each lead 41 by welding or the like.

In the present exemplary embodiment, depending on phases of currents flowing through coils 40, coils 40 each may be referred to as coil U1 to coil U4, coil V1 to coil V4, and coil W1 to coil W4, in some cases.

Bus bar assembly 300 includes bus bar guide 60 and a plurality of bus bars 50. Bus bar guide 60 is configured by arranging a plurality of bus bar guide pieces 60a to 60k in the circumferential direction (see FIG. 3). Each of bus bar guide pieces 60a to 60k is formed by molding thermoplastic insulating resin. Alternatively, a thermosetting resin may be used. A shape and function of bus bar guide 60 will be described in detail later.

Bus bar 50 is formed by bending a conductor including plate-shaped copper or the like into a predetermined shape. An insulating film (not illustrated) is formed on a surface of bus bar 50. However, the insulating film is removed at a connection with lead 41 of coil 40. Bus bar 50 functions as a wire for electrically connecting coils 40 separated in the circumferential direction. For example, coils U1 to U4 are connected in series via the plurality of bus bars 50. A shape of bus bar 50 will be described later.

Rotor 200 includes output shaft 210 and rotor core 220 having output shaft 210 as an axial center which are embedded inside rotor core 220. Rotor 200 has a plurality of magnets 230 each facing stator 100. Magnets 230 have N-poles and S-poles alternately disposed along an outer circumferential direction of the output shaft. Note that a material, a shape, and a quality of material of magnets 230 can be appropriately changed depending on an output of motor 1000 and the like. Rotor core 220 is formed by, for example, stacking electromagnetic steel sheets containing silicon and the like and then by punching the stacked electromagnetic steel sheets.

Motor case 400 is a bottomed tubular metal component. Motor case 400 accommodates stator 100 and rotor 200 inside. When motor case 400 includes a magnetic material such as iron, motor case 400 may function as a yoke constituting a magnetic path. In this case, yoke 20 may be omitted.

Coils U1 to U4, V1 to V4, and W1 to W4 are each connected in series. Three phase currents of U, V, and W having 120° phase differences in electric angle are respectively supplied to coils U1 to U4, V1 to V4, and W1 to W4 to excite the coils. Thus, a rotating magnetic field is generated in stator 100. The rotating magnetic field and the magnetic field generated by magnets 230 provided in rotor 200 causes an interaction between them, and a torque is thus generated. As a result, output shaft 210 is supported by a bearing (not illustrated) and rotates.

[Configuration of Bus Bar Guide and Bus Bar]

Figure 3:
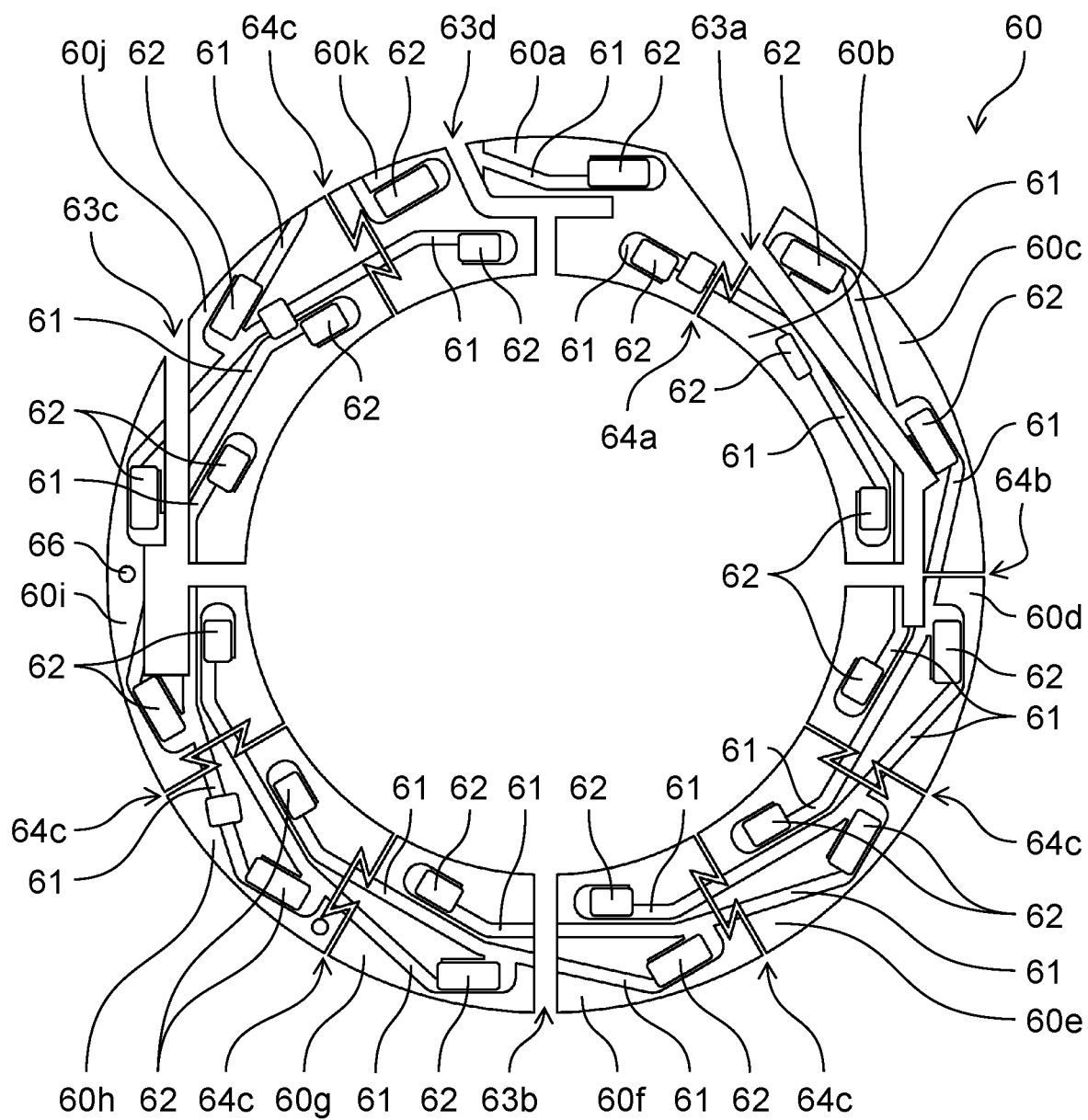
FIG. 3 is a top view of a bus bar guide.
Figure 4A:
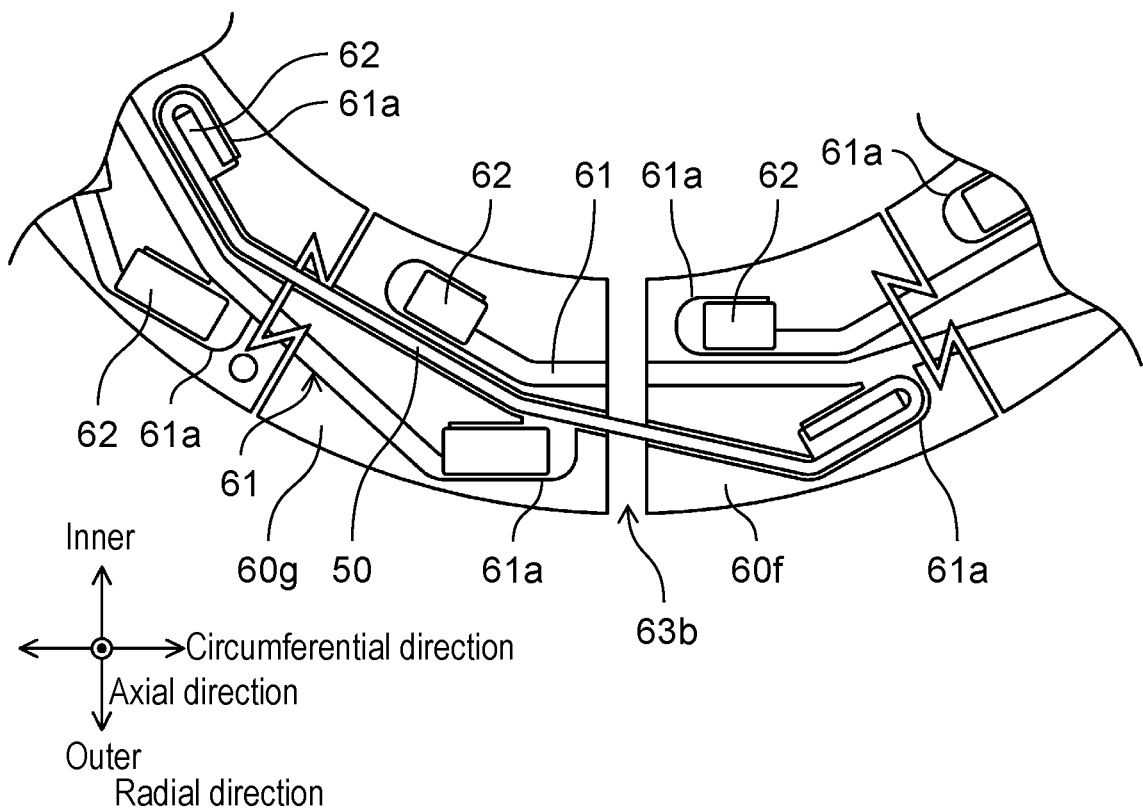
FIG. 4A is a top view of the bus bar guide in which a bus bar is disposed in a groove.
Figure 4B:
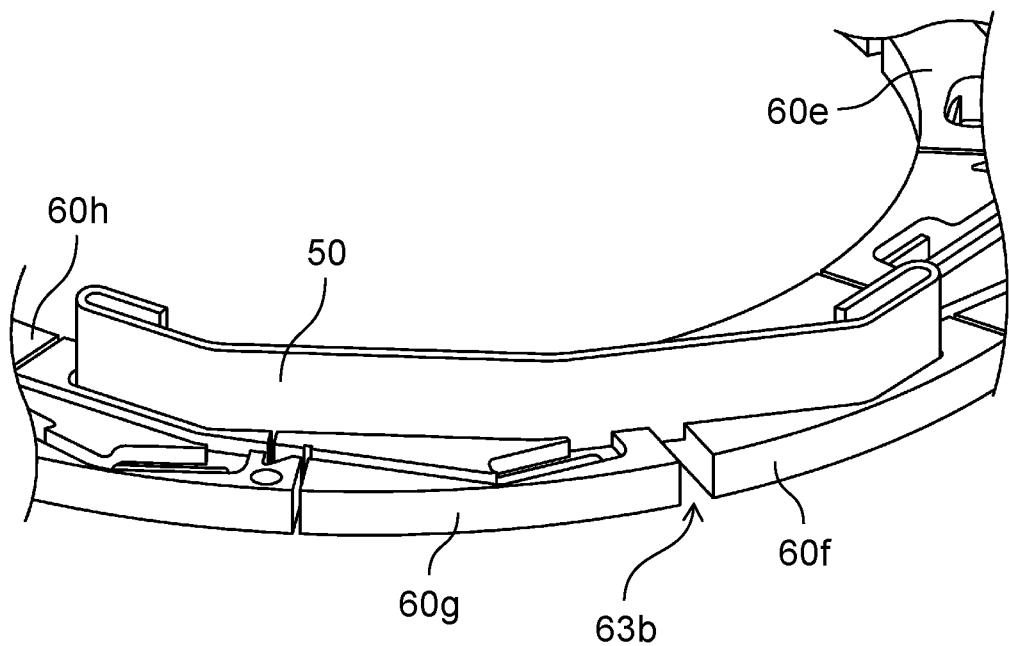
FIG. 4B is a perspective view of the bus bar guide illustrated in FIG. 4A.

FIG. 3 is a top view of the bus bar guide. FIG. 4A is a top view of the bus bar guide in which the bus bar is disposed in a groove. FIG. 4B is a perspective view of the bus bar guide illustrated in FIG. 4A. For convenience of description, FIGS. 4A and 4B each illustrate only one bus bar 50.

Figure 5A:
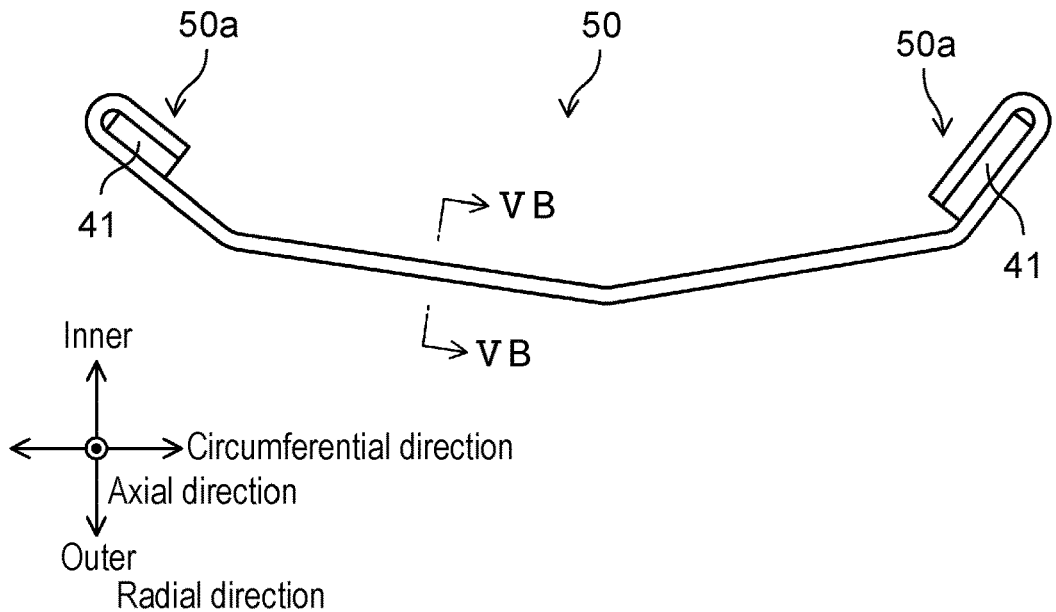
FIG. 5A is a top view of the bus bar.
Figure 5B:
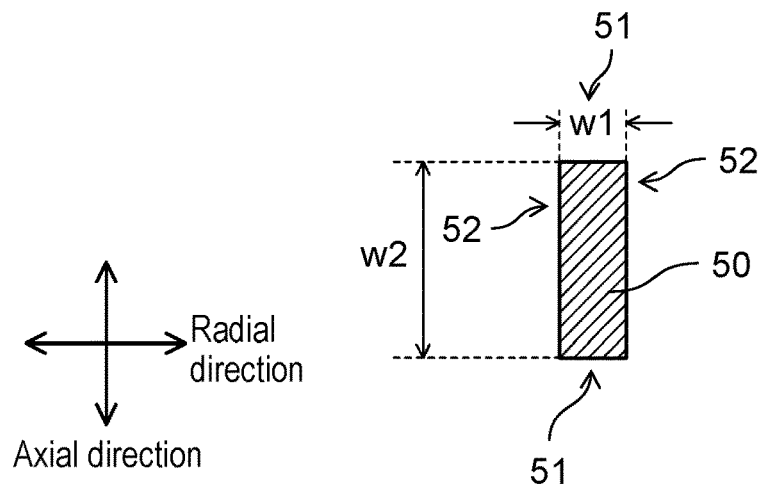
FIG. 5B is a schematic sectional view taken along line VB-VB in FIG. 5A.
Figure 5C:
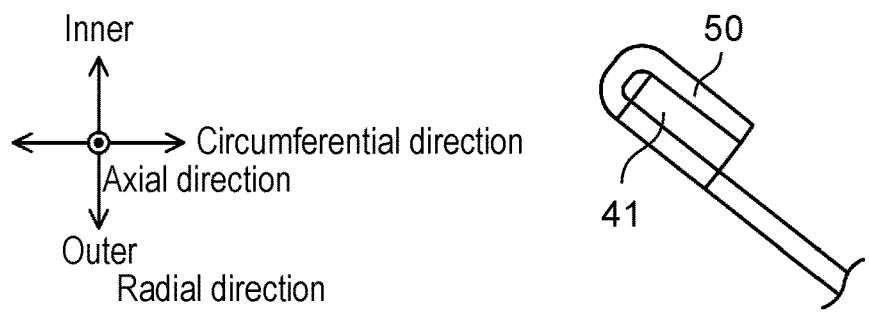
FIG. 5C is an enlarged view of an end of the bus bar illustrated in FIG. 5A.
Figure 6A:
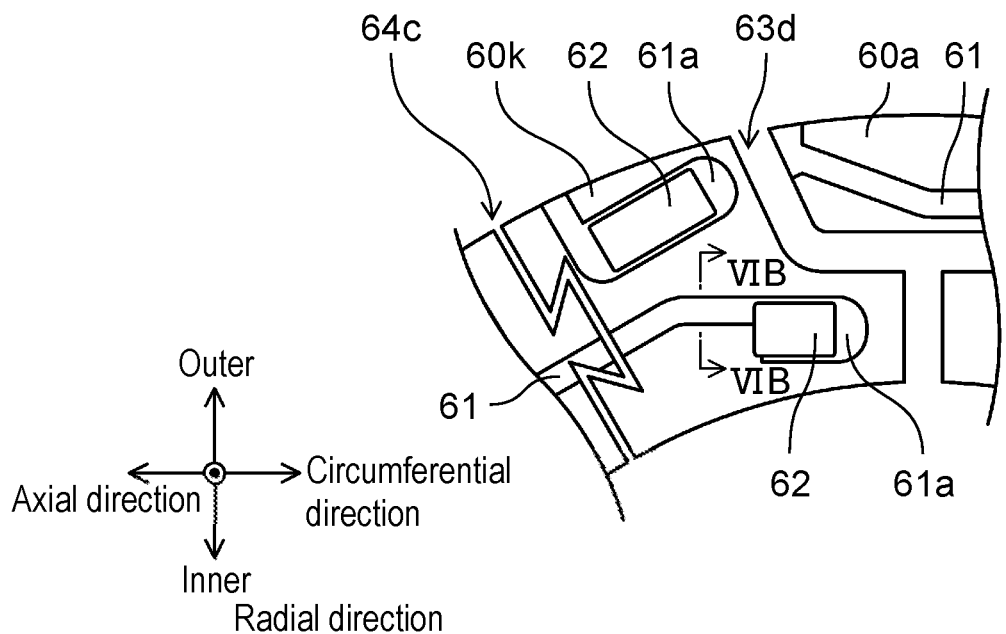
FIG. 6A is an enlarged top view of the groove.
Figure 6B:
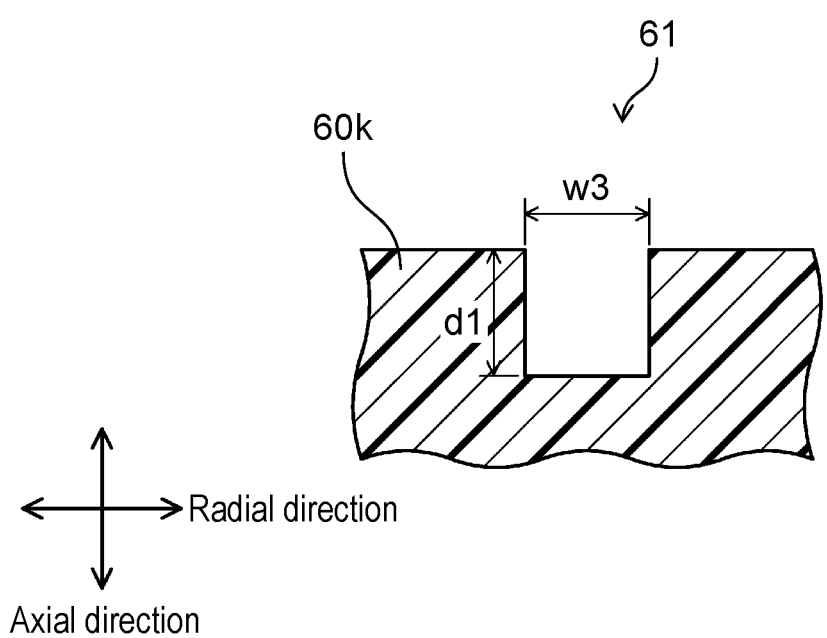
FIG. 6B is a schematic sectional view taken along line VIB-VIB in FIG. 6A.
Figure 7A:
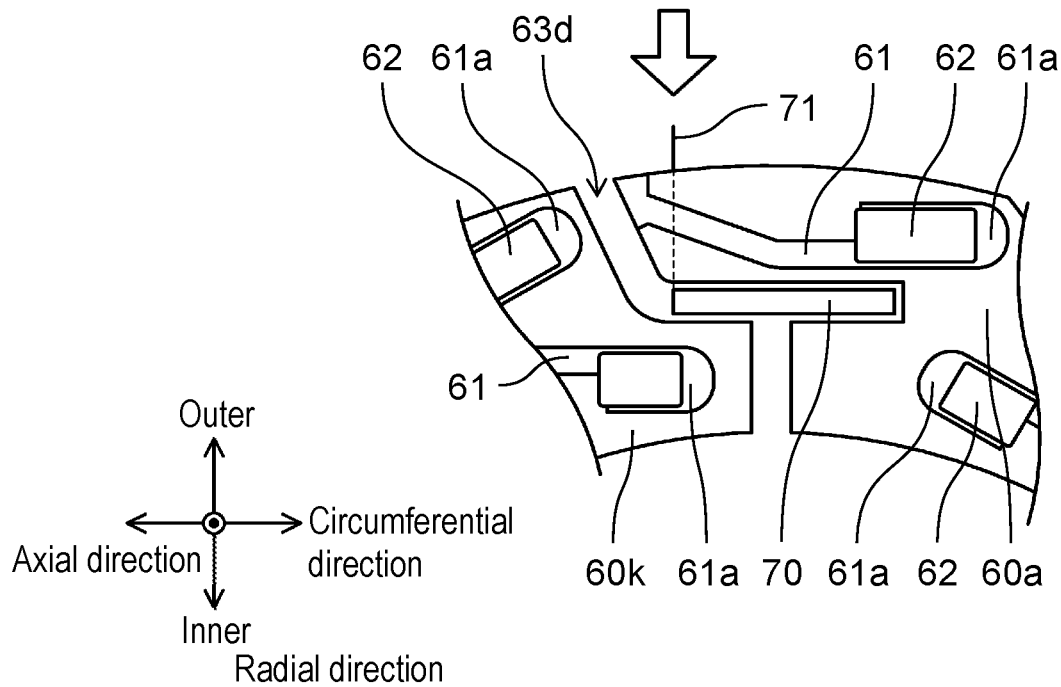
FIG. 7A is an enlarged top view of a gap.
Figure 7B:
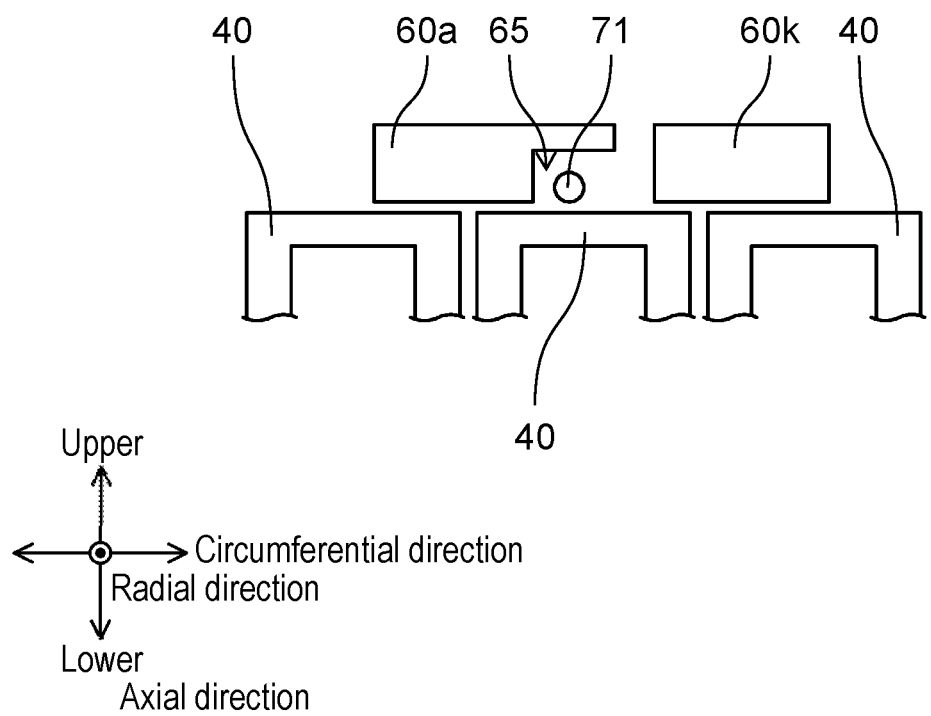
FIG. 7B is a schematic view of a vicinity of the gap as viewed from a radial direction.

FIG. 5A is a top view of the bus bar. FIG. 5B is a schematic sectional view taken along line VB-VB in FIG. 5A. FIG. 5C is an enlarged view of an end of the bus bar illustrated in FIG. 5A. FIG. 6A is an enlarged top view of the groove. FIG. 6B is a schematic sectional view taken along line VIB-VIB in FIG. 6A. FIG. 7A is an enlarged top view of a gap. FIG. 7B is a schematic view of a vicinity of the gap as viewed from the radial direction. FIG. 7B is a schematic view as viewed in a direction of an arrow illustrated in FIG. 7A.

In FIGS. 5A and 5C, lead 41 of coil 40 is shown. In FIGS. 7A and 7B, illustration of bus bar 50 is omitted. In bus bar guide 60, a surface on a side where bus bar 50 is disposed may be referred to as an upper surface of bus bar guide 60, and a surface on an opposite side thereof may be referred to as a lower surface of bus bar guide 60.

As illustrated in FIG. 3, bus bar guide 60 is configured by arranging eleven bus bar guide pieces 60a to 60k in the circumferential direction. Bus bar guide pieces 60a and 60b adjacent to each other are fitted and connected to each other by fitting part 64a. Bus bar guide pieces 60c and 60d adjacent to each other are fitted and connected to each other by fitting part 64b. Three bus bar guide pieces 60d to 60f adjacent to each other are fitted and connected to each other by fitting part 64c. Three bus bar guide pieces 60g to 60i adjacent to each other are fitted and connected to each other by fitting part 64c. Bus bar guide pieces 60j and 60k adjacent to each other are fitted and connected to each other by fitting part 64c. In the following description, fitting parts 64a to 64c may be collectively referred to as a fitting part 64.

On the other hand, bus bar guide pieces 60a and 60c are divided with a space therebetween and bus bar guide pieces 60b and 60c are divided with a space therebetween by gap 63a. Bus bar guide pieces 60f and 60g are divided with a space therebetween by gap 63b. Bus bar guide pieces 60i and 60*j* are divided with a space therebetween by gap 63*c*. Bus bar guide pieces 60*k* and 60*a* are divided with a space therebetween by gap 63*d*. In other words, bus bar guide 60 is divided into a plurality of parts in the circumferential direction by gaps 63*a* to 63*d*.

As is clear from FIG. 3, the plurality of fitting parts 64*c* have the same shape. Fitting parts 64*a* and 64*b* have different shapes, and also have different shapes from fitting part 64*c*.

Each of bus bar guide pieces 60*a* to 60*k* is provided with through hole 62 and groove 61. Groove 61 is formed in one bus bar guide piece or across a plurality of bus bar guide pieces. As illustrated in FIG. 3, bus bar 50 connected to a connection line with an external power supply is disposed in groove 61 formed only in each of bus bar guide pieces 60*j*, 60*k*, and 60*a*. Lead 41 of the coil 40 is drawn upward of bus bar guide 60 through hole 62. In this way, each lead 41 of coil 40 is connected to end 50*a* of bus bar 50. As illustrated in FIGS. 4A and 4B, groove 61 is formed on the upper surface of bus bar guide 60, and both ends 50*a* of bus bar 50 are bent and fitted into groove 61.

Both ends 50*a* of bus bar 50 are folded back in the same direction in the circumferential direction such that distal ends of both ends 50*a* are located on a radially inner side. Groove 61 also has curved part 61*a* curved in a hairpin shape so as to accommodate folded end 50*a* of bus bar 50. Curved part 61*a* is disposed to surround through hole 62 in top view.

In a state where bus bar assembly 300 is attached to stator 100, as illustrated in FIGS. 5A and 5C, leads 41 are sandwiched between both ends 50*a* of bus bar 50. Lead 41 and bus bar 50 are joined to each other by welding, fusing (thermal caulking), or the like. In this way, by fitting bus bar 50 into each of the plurality of grooves 61, through hole 62 and bus bar 50 corresponding to a position of lead 41 are positioned.

As illustrated in FIG. 5B, bus bar 50 has a pair of first surfaces 51 extending in the radial direction and facing each other, and a pair of second surfaces 52 extending in the axial direction and facing each other. First surfaces 51 are continuous with second surfaces 52 and are substantially orthogonal to second surfaces 52. The shape of bus bar 50 is set such that width w2 of second surfaces 52 is wider than width w1 of first surfaces 51. Bus bar 50 is fitted into groove 61 such that first surface 51 is in contact with a bottom surface of groove 61 (see FIGS. 4A and 4B).

As illustrated in FIGS. 6A and 6B, when a depth of groove 61 is denoted by d1 and a width of groove 61 is denoted by w3, widths w1 and w2 and depth d1 and width w3 satisfy relationships represented by the following formulas (1) and (2).

$$d1 \leq 0.5 \times w2 \quad (1) \quad w1 < w3 \leq 2 \times w1 \quad (2)$$

As illustrated in FIG. 1, in a state where bus bar guide 60 is attached to an upper part of stator 100, temperature detection sensor 70 is disposed inside each of gaps 63*a* to 63*d* when viewed from above in the axial direction. Temperature detection sensor 70 detects a temperature of motor 1000, particularly coil 40. As illustrated in FIG. 7A, wire 71 is connected to temperature detection sensor 70, an output signal of temperature detection sensor 70 is output to a motor controller (not illustrated) via wire 71, and a temperature of motor 1000 is monitored, for example. When the output signal of the temperature detection sensor 70 is greater than or equal to a predetermined value, the motor controller causes a temperature abnormality to be notified. Alternatively, motor 1000 is stopped after the abnormality is notified. As temperature detection sensor 70, for example, a thermistor or a thermocouple is used.

As illustrated in FIG. 7B, wire 71 connected to temperature detection sensor 70 located inside gap 63*d* is partially covered with step 65 provided on the lower surface of bus bar guide 60. As illustrated in FIG. 3, hole 66 is formed on a radially outer side of gap 63*c*. When temperature detection sensor 70 is disposed inside gap 63*c*, hole 66 is provided to pass a string-like member (not illustrated) for fixing wire 71 connected to temperature detection sensor 70 to bus bar guide 60 or bus bar 50.

Effects and Others

As described above, bus bar guide 60 according to the present exemplary embodiment is provided to fix bus bar 50 that connects the plurality of coils 40 disposed in motor 1000. Bus bar 50 includes a conductor that has a plate shape and has first surfaces 51 and second surfaces 52 continuous with first surfaces 51.

Bus bar guide 60 is configured by annularly arranging the plurality of bus bar guide pieces 60*a* to 60*k* each including an insulator. Each of the plurality of bus bar guide pieces 60*a* to 60*k* is provided with groove 61 for holding first surface 51 of bus bar 50 and positioning bus bar 50.

By configuring bus bar guide 60 with the plurality of bus bar guide pieces 60*a* to 60*k*, variations in the shape of bus bar 50 and the like can be absorbed. Thus, bus bar 50 can be easily disposed in bus bar guide 60. It is also possible to absorb positional variation of lead 41 of coil 40. Accordingly, bus bar 50 can be correctly disposed in accordance with the position of lead 41. By providing groove 61 on the upper surface of bus bar guide 60, bus bar 50 can be reliably held.

As illustrated in FIG. 5B, when width w1 of first surfaces 51 of bus bar 50 is narrower than width w2 of second surfaces 52, bus bar 50 can be disposed in a so-called vertical arrangement. Thus, an arrangement area of bus bars 50 can be reduced. As a result, a degree of freedom in arrangement of bus bars 50 can be increased.

As shown in formula (1), depth d1 of groove 61 is preferably less than or equal to a half of width w2 of second surfaces 52 of bus bar 50.

In this way, a surface area of bus bar 50 exposed from groove 61 can be increased. It is therefore possible to secure heat dissipation area of bus bar 50 while holding bus bar 50 by groove 61. Therefore, cooling efficiency of bus bar 50 by air, another refrigerant, or the like can be enhanced. Efficiently cooling bus bar 50 through which a large current flows can suppress a decrease in efficiency of motor 1000. Motor 1000 can be stably driven by suppressing a temperature rise of coil 40 and stator 100. Note that depth d1 needs to be set to such a value that bus bar 50 does not rattle due to vibration of motor 1000 or the like.

As shown in formula (2), width w3 of groove 61 is preferably more than width w1 of first surfaces 51 of bus bar 50 and less than or equal to twice of width w1.

In this way, bus bar 50 can be easily fitted into groove 61, and bus bar 50 can be prevented from rattling due to vibration of motor 1000 or the like.

Bus bar guide 60 is divided into a plurality of parts by gaps 63*a* to 63*d*. In other words, bus bar 50 has at least one set of two bus bar guide pieces adjacent to each other and disposed with a space therebetween along the circumferential direction.

With such a configuration of bus bar guide 60, when positional variation of lead 41, variation in the shape of bus bar 50, or the like becomes large, these variations can be reliably absorbed. Thus, bus bar 50 can be easily disposed in bus bar guide 60. Bus bar 50 can be also correctly disposed in accordance with the position of lead 41.

Bus bar guide 60 includes a plurality of sets of two bus bar guide pieces adjacent to each other, and fitting part 64 for fitting and connecting the bus bar guide pieces to each other is formed in each of at least one set of bus bar guide pieces. Three bus bar guide pieces 60*d* to 60*f* adjacent to each other are fitted and connected to each other by fitting part 64*c*.

With such a configuration of bus bar guide 60, it is possible to secure a strength of bus bar guide 60 against vibration or the like. When groove 61 into which one bus bar 50 is fitted is formed across the plurality of bus bar guide pieces, the positional displacement of groove 61 can be reduced by fitting and connecting these bus bar guide pieces by fitting part 64. Accordingly, bus bar 50 can be stably held by groove 61.

The shape of fitting part 64 formed in each of one set of bus bar guide pieces may be the same as the shape of fitting part 64 formed in each of another set of bus bar guide pieces. For example, three bus bar guide pieces 60*d* to 60*f* adjacent to each other are fitted and connected to each other by fitting parts 64*c* having the same shape. Three bus bar guide pieces 60*g* to 60*i* adjacent to each other are also fitted and connected to each other by fitting parts 64*c* having the same shape.

Defining the shape of fitting part 64 in this manner can increase the number of combinations of bus bar guide pieces that can be connected to each other. Therefore, a degree of freedom in arrangement of bus bar guide 60 can be increased.

The shape of fitting part 64 formed in each of one set of bus bar guide pieces may be different from the shape of fitting part 64 formed in each of another set of bus bar guide pieces. Bus bar guide pieces 60*a* and 60*b* adjacent to each other are fitted and connected to each other by fitting part 64*a*. On the other hand, bus bar guide pieces 60*c* and 60*d* adjacent to each other are fitted and connected to each other by fitting part 64*b* having a different shape from the shape of fitting part 64*a*. Bus bar guide pieces 60*j* and 60*k* adjacent to each other are fitted and connected to each other by fitting part 64*c* having a different shape from the shape of fitting part 64*a* and the shape of fitting part 64*b*.

Defining the shape of fitting part 64 in this manner can arrange the plurality of bus bar guide pieces 60*a* to 60*k* at predetermined positions without making a mistake. As a result, bus bar guide 60 including the plurality of bus bar guide pieces 60*a* to 60*k* can be easily installed.

Temperature detection sensor 70 is disposed inside at least one of gaps 63*a* to 63*d* provided in bus bar guide 60. In other words, in bus bar guide 60, temperature detection sensor 70 is disposed between two bus bar guide pieces disposed with a space therebetween along the circumferential direction.

In this way, an installation area of temperature detection sensor 70 can be secured, and temperature detection sensor 70 can be held by bus bar guide 60.

At least one bus bar guide piece is provided with step 65 on the lower surface which is a surface opposite to the upper surface on which groove 61 is formed. A part of wire 71 connected to temperature detection sensor 70 is covered with step 65.

In this way, wire 71 can be stably disposed in stator 100 including bus bar assembly 300. Even when wire 71 is pulled, the part of the wire covered by step 65 is not largely displaced. Therefore, temperature detection sensor 70 connected to wire 71 is prevented from being detached from a predetermined position. As a result, the temperatures of motor 1000 and coil 40 can be correctly detected.

In the present exemplary embodiment, step 65 is provided on the lower surface of bus bar guide piece 60*a*, but a recess may be provided. Thus, wire 71 does not greatly displaced, and temperature detection sensor 70 connected to wire 71 is prevented from being detached from a predetermined position.

Each of the plurality of bus bar guide pieces 60*a* to 60*k* is provided with through hole 62 through which lead 41 provided on coil 40 passes.

In this way, coil 40 and bus bar 50 can be connected via lead 41.

Groove 61 is also provided with curved part 61*a* corresponding to a folded part provided at both ends of bus bar 50. Through hole 62 is provided in each of bus bar guide pieces 60*a* to 60*k* in accordance with a position of curved part 61*a*. As a result, bus bar 50 can be positioned and disposed with respect to lead 41 of coil 40, and both of lead 41 and bus bar 50 can be reliably connected.

Bus bar assembly 300 according to the present exemplary embodiment includes bus bar guide 60 and the plurality of bus bars 50 disposed in the plurality of grooves 61 provided on the upper surface of bus bar guide 60.

As described above, bus bar guide 60 is configured by arranging the plurality of bus bar guide pieces 60*a* to 60*k* in an annular shape. Gaps 63*a* to 63*d* are provided in the circumferential direction of bus bar guide 60. Thus, variations in the shape of bus bar 50 can be absorbed. Thus, the plurality of bus bars 50 can be easily disposed in bus bar guide 60. It is possible to correctly arrange the plurality of bus bars 50 in accordance with the positions of leads 41 of the plurality of coils 40 disposed along the circumferential direction by absorbing positional variations of leads 41 of coils 40 and the like.

Motor 1000 according to the present exemplary embodiment includes at least rotor 200 having output shaft 210 at an axial center, stator 100 disposed with a predetermined space from rotor 200, and bus bar assembly 300 attached to the upper part of stator 100.

Stator 100 includes at least yoke 20 having an annular shape, the plurality of teeth 10 connected to the inner circumference of yoke 20 at predetermined intervals, and the plurality of coils 40 attached respectively to the plurality of teeth 10. Two of the plurality of coils 40 are electrically connected via one bus bar 50 of the plurality of bus bars 50.

With such a configuration of motor 1000, two coils 40 disposed apart from each other along the circumferential direction can be connected by bus bar 50. For example, a delta-connection motor or a star-connection motor can be easily achieved.

The plurality of bus bars 50 can be easily installed in bus bar guide 60. The plurality of bus bars 50 are positioned and disposed in bus bar guide 60, and thus connection work between bus bars 50 and the coils is facilitated. As a result, an assembly process of stator 100 and motor 1000 is simplified, and an assembly cost can be reduced.

The plurality of bus bars 50 are respectively disposed in the plurality of grooves 61 provided on the upper surface of bus bar guide 60. Coil 40 has lead 41 for connecting with bus bar 50. Lead 41 of coil 40 is drawn upward of bus bar guide 60 through through hole 62 provided in bus bar guide 60. Lead 41 is electrically connected to bus bar 50.

In this way, the part of coil 40 other than lead 41 and bus bar 50 are reliably insulated by bus bar guide 60. In bus bar guide 60, groove 61 and through hole 62 are formed in a state of being positioned in advance. As a result, bus bar 50 and lead 41 of coil 40 can be connected to each other in a state of being positioned.

Both ends 50a of bus bar 50 are folded back. Lead 41 and bus bar 50 are electrically connected to each other with lead 41 sandwiched by end 50a of bus bar 50.

Such a configuration of bus bar 50 can increase a contact area between bus bar 50 and lead 41. It is thus possible to suppress an increase in electric resistance between bus bar 50 and coil 40. In addition, a mechanical strength of a connection between bus bar 50 and lead 41 can be enhanced. Therefore, reliability of motor 1000 for a long-term use can be enhanced.

As described above, bus bar guide 60 according to the present exemplary embodiment is bus bar guide 60 that fixes bus bar 50 that connects a plurality of coils 40 provided in motor 1000, in which bus bar 50 includes a conductor having a plate shape and having a pair of first surfaces 51 that extend in a radial direction and face each other and a pair of second surfaces 52 that extend in an axial direction, are continuous with the pair of first surfaces 51, and face each other, bus bar guide 60 is configured by annularly arranging a plurality of bus bar guide pieces 60a to 60k each including an insulator, and each of the plurality of bus bar guide pieces 60a to 60k is provided with groove 61 that holds first surface 51 of bus bar 50 and positions bus bar 50.

As a result, variations in the shape of bus bar 50 can be absorbed, and bus bar 50 can be easily disposed in bus bar guide 60.

There may be provided at least one set of two bus bar guide pieces 60a, 60b adjacent to each other and disposed with a space therebetween along the outer circumferential direction of bus bar guide 60.

There may be provided the plurality of sets of two bus bar guide pieces 60a to 60d adjacent to each other, and fitting part 64c for fitting and connecting the bus bar guide pieces to each other is formed in each of at least one set of bus bar guide pieces 60a, 60b.

The shape of fitting part 64c formed in each of one set of bus bar guide pieces 60a, 60b may be the same as the shape of fitting part 64c formed in each of another set of bus bar guide pieces 60c, 60d.

The shape of fitting part 64c formed in each of one set of bus bar guide pieces 60a, 60b may be different from the shape of fitting part 64c formed in each of another set of bus bar guide pieces 60c, 60d.

A sensor equivalent to temperature detection sensor 70 may be disposed between two bus bar guide pieces 60a, 60b disposed with a space therebetween along the outer circumferential direction of bus bar guide 60.

At least one bus bar guide piece 60a is preferably provided with step 65 or a recess on a surface opposite to the surface on which groove 61 is formed, and step 65 or the recess preferably covers at least a part of wire 71 connected to the sensor equivalent to temperature detection sensor 70.

The depth of groove 61 is preferably less than or equal to a half of the width of second surfaces 52 of bus bar 50.

Each of the plurality of bus bar guide pieces 60a to 60k may be provided with through hole 62 through which lead 41 provided on coil 40 passes.

First surfaces 51 preferably have a narrower width than the width of second surfaces 52.

Bus bar assembly 300 according to the present exemplary embodiment includes at least bus bar guide 60 and the plurality of bus bars 50 disposed in the plurality of grooves 61 provided on the upper surface of bus bar guide 60.

As a result, variations in the shape of bus bar 50 can be absorbed, and the plurality of bus bars 50 can be easily disposed in bus bar guide 60.

Motor 1000 according to the present exemplary embodiment includes at least rotor 200 having output shaft 210 at an axial center, stator 100 disposed with a predetermined space from rotor 200, bus bar assembly 300 attached to an upper part of stator 100, in which stator 100 includes yoke 20 having an annular shape, a plurality of teeth 10 connected to an inner circumference of yoke 20 at predetermined intervals, and a plurality of coils 40 respectively attached to the plurality of teeth 10, and two coils 40 of the plurality of coils 40 are electrically connected via one bus bar 50 of the plurality of bus bars 50.

Thus, the plurality of bus bars 50 can be easily installed in bus bar guide 60. Since the plurality of bus bars 50 are positioned and disposed in bus bar guide 60, the assembly process of motor 1000 is simplified, and the assembly cost can be reduced.

The plurality of bus bars 50 are preferably disposed in the plurality of grooves 61 provided on the upper surface of bus bar guide 60, coil 40 preferably has lead 41 for connecting to bus bar 50, and lead 41 preferably passes through hole 62 provided in bus bar guide 60, is drawn upward of bus bar guide 60, and is electrically connected to bus bar 50.

Both ends of the bus bar are preferably folded back, and lead 41 and bus bar 50 are preferably electrically connected to each other with lead 41 sandwiched by each of the ends of bus bar 50.

First Modification

Figure 8A:
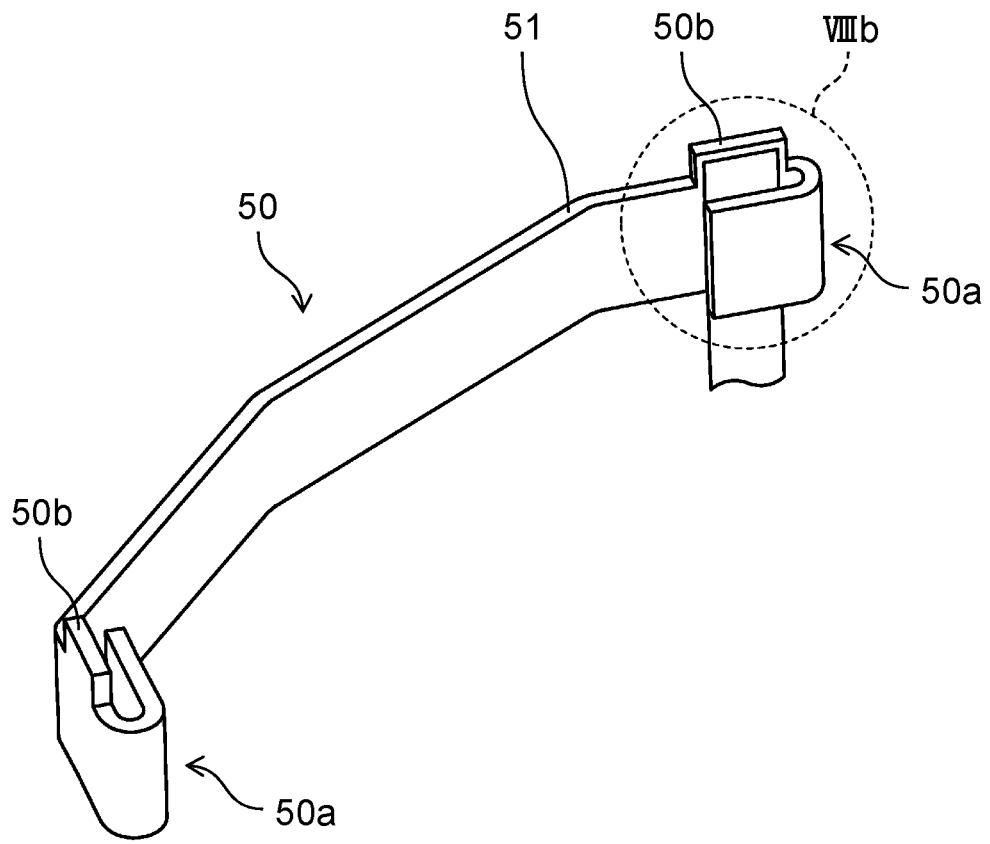
FIG. 8A is a perspective view of a bus bar according to a first modification.
Figure 8B:
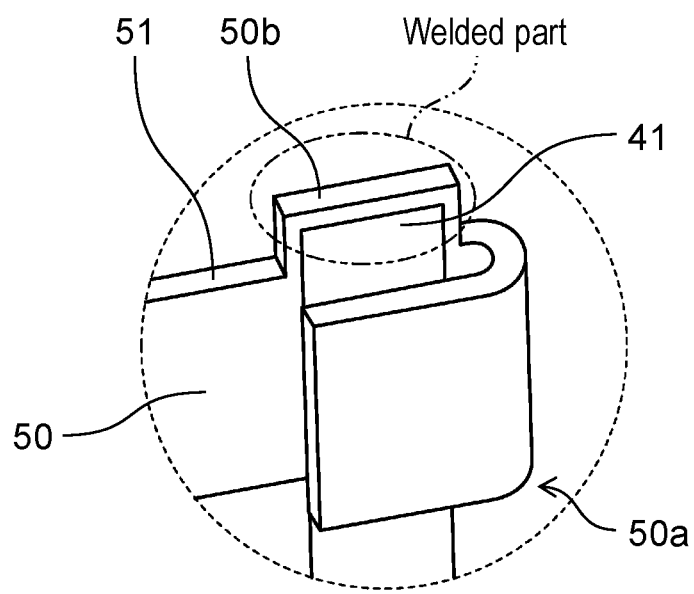
FIG. 8B is an enlarged schematic view of a connection between a bus bar and a lead according to the first modification.

FIG. 8A is a perspective view of a bus bar according to a first modification. FIG. 8B is an enlarged schematic view of a connection between the bus bar and a lead according to the first modification. In FIGS. 8A and 8B, the same parts as those in the exemplary embodiment are denoted by the same reference marks, and the detailed description thereof will be omitted.

Bus bar 50 illustrated in FIGS. 8A and 8B is different from bus bar 50 illustrated in FIG. 5A in that protrusion 50b extending upward from first surface 51 is formed at each of both ends 50a. The distal end of lead 41 is supported by protrusion 50b in a state where bus bar 50 and lead 41 and are connected to each other.

In the present modification, lead 41 can be reliably held by end 50a of bus bar 50. In a case where bus bar 50 is not provided with protrusion 50b, the distal end of lead 41 may be positioned below first surface 51 on an upper part of bus bar 50 when a length of lead 41 varies. In this case, the contact area between lead 41 and bus bar 50 cannot be sufficiently secured, and the reliability of the connection may be deteriorated.

On the other hand, in the present modification, protrusion 50b extending upward from first surface 51 of bus bar 50 is provided, and lead 41 is supported by protrusion 50b. That is, the distal end of lead 41 is disposed to protrude upward from first surface 51 on the upper part of bus bar 50. Therefore, the contact area between lead 41 and bus bar 50 can be sufficiently secured.

Connecting protrusion 50b and the distal end of lead 41 by welding or the like can simplify the connection work between lead 41 and bus bar 50.

As described above, in the motor according to the present modification, each of both ends of the plurality of bus bars 50 is provided with protrusion 50b extending from first surfaces 51, and lead 41 and bus bar 50 are electrically connected to each other with the distal end of lead 41 supported by protrusion 50b.

Second Modification

Figure 9:
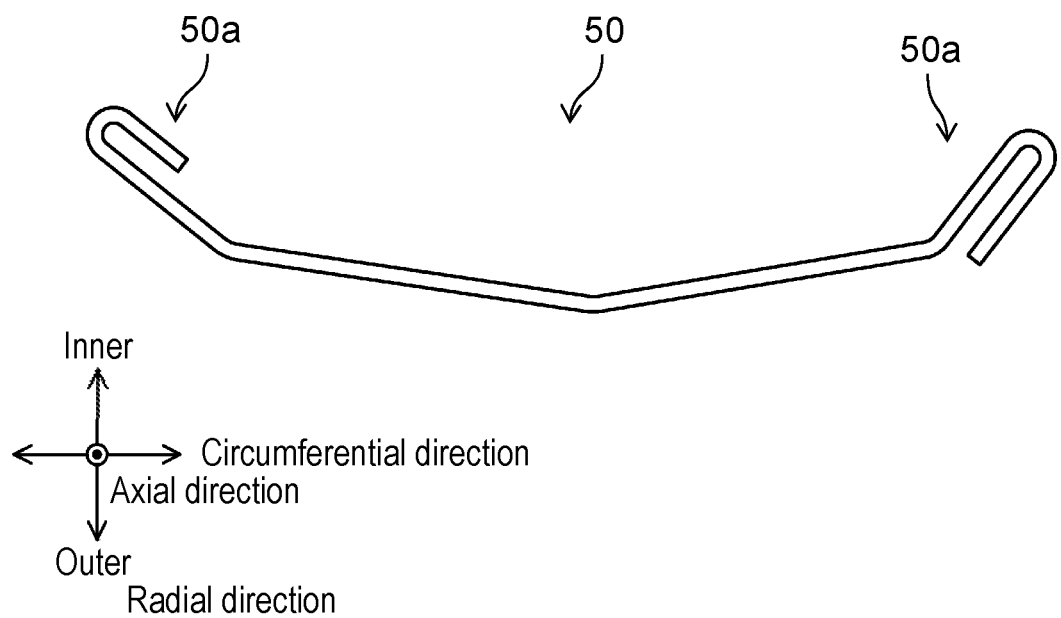
FIG. 9 is a top view of a bus bar according to a second modification.

FIG. 9 is a top view of a bus bar according to a second modification. In FIG. 9, the same parts as those in the exemplary embodiment are denoted by the same reference marks, and the detailed description thereof will be omitted.

Bus bar 50 illustrated in FIG. 9 is different from bus bar 50 illustrated in FIGS. 1 and 5A in that one end 50a and another end 50a are folded back in opposite directions in the circumferential direction. Both ends 50a of bus bar 50 illustrated in FIGS. 1 and 5A are folded back in the same direction in the circumferential direction such that the distal ends of both ends 50a are located on the radially inner side.

In the present modification, it is possible to suppress deformation of bus bar 50 when an excessive mechanical impact is applied to bus bar 50. In bus bar assembly 300 illustrated in FIG. 1, since both ends 50a of each of bus bars 50 are fixed, a center of bus bar 50 is largely displaced when an impact is applied in the radial direction. At this time, as illustrated in FIG. 5A, when both ends 50a of bus bar 50 are folded back in the same direction in the circumferential direction, the center of bus bar 50 may be largely displaced depending on a magnitude and direction of a force applied to bus bar 50, and may be finally deformed.

On the other hand, in the present modification, since both ends 50a of bus bar 50 are folded back to the opposite sides in the circumferential direction, the force applied to bus bar 50 in the radial direction can be offset by both ends 50a, and the displacement of the center of bus bar 50 is suppressed. Thus, the deformation of bus bar 50 can be suppressed.

In the motor according to the present modification, both ends of each of the plurality of bus bars 50 include a first end and a second end that are folded back in opposite directions in an outer circumferential direction of the bus bar guide.

It is therefore possible to suppress the deformation of bus bar 50 when an excessive mechanical impact is applied to bus bar 50.

Other Exemplary Embodiments

Note that a new exemplary embodiment can be formed by appropriately combining the components described in the exemplary embodiment and the first and second modifications. For example, protrusion 50b illustrated in the first modification may be provided on bus bar 50 illustrated in the second modification.

Coil 40 may be a general edgewise coil or a molded coil. The "molded coil" herein does not include a coil in which a conductive wire merely having a constant width and thickness is wound in a spiral shape.

The molded coil is formed, for example, by preparing a plurality of rectangular plate members having different lengths, widths, or thicknesses, and joining these plate members by cold pressure welding, welding, or another method. A material of the plate members is a low-resistance material such as copper or aluminum.

Alternatively, the molded coil may be formed by so-called casting in which copper or the like is melted and poured into a mold. The molded coil may be formed by bending, at a predetermined position, a plate-shaped conductive wire formed in advance to have a width or thickness that differs midways. Alternatively, the molded coil may be formed by rolling a plate-shaped conductive wire having a constant width and thickness at a predetermined portion, changing the width or thickness midways, and then spirally winding the conductive wire. In short, the molded coil is formed by processing in still another way in addition to winding a conductive wire or by a method different from simply winding a conductive wire.

A sensor other than temperature detection sensor 70 may be attached to stator 100. For example, a magnetic detection sensor may be disposed inside at least one of gaps 63a to 63d provided in bus bar guide 60.

The bus bar guide of the present invention can absorb variations in the shapes of the bus bar and the coil and can arrange the bus bar in a predetermined position. The bus bar guide is therefore usefully applied for the motor.

The invention claimed is:

1. A bus bar guide that fixes a bus bar that connects a plurality of coils provided in a motor, wherein
   the bus bar includes a conductor having a plate shape and having a pair of first surfaces that extend in a radial direction and face each other and a pair of second surfaces that extend in an axial direction, are continuous with the pair of first surfaces, and face each other,
   the bus bar guide includes a plurality of bus bar guide pieces annually arranged, each of the plurality of bus bar guide pieces comprises an insulator,
   each of the plurality of bus bar guide pieces is provided with a groove that holds one of the pair of first surfaces of the bus bar and positions the bus bar,
   the plurality of bus bar guide pieces includes a first piece and a second piece connected to the first piece,
   the groove of the first piece is configured to receive a middle portion of the bus bar, and
   the groove of the second piece includes a first portion having a first width and a second portion having a second width greater than the first width configured to receive an end portion of the bus bar.

2. The bus bar guide according to claim 1, comprising at least one set of two bus bar guide pieces adjacent to each other and disposed with a space between the two bus bar guide pieces along an outer circumferential direction of the bus bar guide.

3. The bus bar guide according to claim 2, comprising a plurality of sets of two bus bar guide pieces adjacent to each other, wherein each of at least one set of bus bar guide pieces is provided with a fitting part that fits and connects the bus bar guide pieces to each other.

4. The bus bar guide according to claim 3, wherein the fitting part provided in each of one set of bus bar guide pieces has an identical shape to a shape of the fitting part provided in each of another set of bus bar guide pieces.

5. The bus bar guide according to claim 3, wherein the fitting part provided in each of one set of bus bar guide pieces has a different shape from a shape of the fitting part provided in each of another set of bus bar guide pieces.

6. A bus bar guide that fixes a bus bar that connects a plurality of coils provided in a motor, wherein
   the bus bar includes a conductor having a plate shape and having a pair of first surfaces that extend in a radial direction and face each other and a pair of second surfaces that extend in an axial direction, are continuous with the pair of first surfaces, and face each other,
   the bus bar guide includes a plurality of bus bar guide pieces annually arranged, each of the plurality of bus bar guide pieces comprises an insulator,
   each of the plurality of bus bar guide pieces is provided with a groove that holds one of the pair of first surfaces of the bus bar and positions the bus bar, and
   a sensor is disposed between two bus bar guide pieces adjacent to each other with a space along an outer circumferential direction of the bus bar guide.

7. The bus bar guide according to claim 6, wherein
at least one bus bar guide piece is provided with a step or a recess on a surface opposite to a surface on which the groove is provided, and
the step or the recess covers at least a part of a wire connected to the sensor.

8. The bus bar guide according to claim 1, wherein the groove has a depth that is less than or equal to half of a width of the pair of second surfaces of the bus bar.

9. The bus bar guide according to claim 1, wherein each of the plurality of bus bar guide pieces is provided with a through hole through which a lead provided on each of the plurality of coils passes.

10. The bus bar guide according to claim 1, wherein the pair of first surfaces have a narrower width than a width of the pair of second surfaces.

11. A bus bar assembly comprising:
at least the bus bar guide according to claim 1; and
a plurality of the bus bars disposed in a plurality of the grooves provided on an upper surface of the bus bar guide.

12. A motor comprising:
at least a rotor having an output shaft at an axial center;
a stator disposed with a predetermined space from the rotor; and
the bus bar assembly according to claim 11 attached to an upper part of the stator,
wherein
the stator at least includes
  a yoke having an annular shape,
  a plurality of teeth connected to an inner circumference of the yoke at predetermined intervals, and
  a plurality of coils respectively attached to the plurality of teeth, and
two of the plurality of coils are electrically connected via one of the plurality of bus bars.

13. The motor according to claim 12, wherein
the plurality of bus bars are respectively disposed in a plurality of the grooves provided on the upper surface of the bus bar guide,
each of the plurality of coils has a lead that is connected to each of the plurality of bus bars, and
the lead passes through a through hole provided in the bus bar guide, is drawn upward of the bus bar guide, and is electrically connected to one of the plurality of bus bars.

14. The motor according to claim 13, wherein
each of the plurality of bus bars has both ends folded back, and
the lead and one of the plurality of bus bars are electrically connected to each other with the lead sandwiched by each of the both ends of each of the plurality of bus bars.

15. The motor according to claim 14, wherein
each of the both ends of the plurality of bus bars is provided with a protrusion extending from one of the pair of first surfaces, and
the lead and one of the plurality of bus bars are electrically connected to each other with a distal end of the lead supported by the protrusion.

16. The motor according to claim 14, wherein the both ends of each of the plurality of bus bars include a first end and a second end that are folded back in opposite directions in an outer circumferential direction of the bus bar guide.

17. The bus bar guide according to claim 1, wherein the groove of the first piece has the first width.

* * * * *